(12) United States Patent
Zhou et al.

(10) Patent No.: US 11,436,250 B2
(45) Date of Patent: Sep. 6, 2022

(54) TRANSACTION SAVEPOINT MANAGEMENT APPARATUS AND METHOD FOR DISTRIBUTED DATABASE

(71) Applicant: China UnionPay Co., Ltd., Shanghai (CN)

(72) Inventors: Jiajing Zhou, Shanghai (CN); Qingshun Luo, Shanghai (CN); Chenguang Pei, Shanghai (CN); Hao Miao, Shanghai (CN); Huabei Shi, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 105 days.

(21) Appl. No.: 16/620,060

(22) PCT Filed: Jun. 1, 2018

(86) PCT No.: PCT/CN2018/089528
§ 371 (c)(1),
(2) Date: Dec. 6, 2019

(87) PCT Pub. No.: WO2018/228220
PCT Pub. Date: Dec. 20, 2018

(65) Prior Publication Data
US 2021/0081429 A1    Mar. 18, 2021

(30) Foreign Application Priority Data

Jun. 12, 2017 (CN) .......................... 201710437814.5

(51) Int. Cl.
*G06F 16/00* (2019.01)
*G06F 16/27* (2019.01)

(52) U.S. Cl.
CPC .................................. *G06F 16/27* (2019.01)

(58) Field of Classification Search
CPC ....................................................... G06F 16/27
See application file for complete search history.

(56) References Cited

U.S. PATENT DOCUMENTS

2002/0174108 A1* 11/2002 Cotner ................ G06F 16/2322
2006/0136505 A1*  6/2006 Bird ................... G06F 16/2365
(Continued)

FOREIGN PATENT DOCUMENTS

CN          1507597 A      6/2004
CN        103294479 A      9/2013
(Continued)

OTHER PUBLICATIONS

Int'l Search Report and Written Opinion dated Aug. 31, 2018 in Int'l Application No. PCT/CN2018/089528, translation of ISR only.
(Continued)

*Primary Examiner* — Khanh B Pham
(74) *Attorney, Agent, or Firm* — Panitch Schwarze Belisario & Nadel LLP

(57) ABSTRACT

Proposed are a transaction savepoint management apparatus and method, which may involve: creating, based on a transaction initiation request from a user terminal, a transaction, wherein the transaction includes a plurality of operation instructions, and subsequently accessing at least one of a plurality of databases so as to sequentially execute the plurality of operation instructions according to a time sequence; and if the plurality of operation instructions includes global savepoint establishment instruction, creating and maintaining a global savepoint queue to coordinate the plurality of databases and implement an operation for global savepoints, and based on the global savepoints, triggering a database, involved in this transaction, from among the plurality of databases to establish local savepoints and record an association relationship between each of the local savepoints and the global savepoints. The apparatus and
(Continued)

method disclosed in the present invention can be used for transaction savepoint management for a distributed database.

8 Claims, 7 Drawing Sheets

(56) References Cited

U.S. PATENT DOCUMENTS

2007/0239798 A1* 10/2007 Shringi ............... G06F 16/2365
2009/0063579 A1* 3/2009 Chan ................... G06F 16/2365
2016/0188447 A1* 6/2016 Lamego ............. G06F 11/1458
717/124

FOREIGN PATENT DOCUMENTS

| CN | 103902560 A | 7/2014 |
| CN | 106503132 A | 3/2017 |
| CN | 107545024 A | 1/2018 |

OTHER PUBLICATIONS

Office Action dated Aug. 27, 2021 in Indian Application No. 202027001274.

* cited by examiner

Creating, based on a transaction initiation request from a user terminal, a transaction including a plurality of operational instructions, and accessing at least one of a plurality of databases to sequentially execute the plurality of operational instructions in time sequence

If the plurality of operational instructions includes a global savepoint establishment instruction, creating and maintaining a global savepoint queue so as to coordinate the plurality of databases to implement operations directed to a global savepoint, triggering, based on the global savepoint, a database involved in the transaction from among the plurality of databases to establish a local savepoint, and recording an association relationship between each local savepoint and the global savepoint

Fig.2

TRANSACTION SAVEPOINT MANAGEMENT APPARATUS AND METHOD FOR DISTRIBUTED DATABASE

CROSS-REFERENCE TO RELATED APPLICATION

This application is a Section 371 of International Application No. PCT/CN2018/089528, filed Jun. 1, 2018, which was published in the Chinese language on Dec. 20, 2018 under International Publication No. WO 2018/228220 A1, which claims priority under 35 U.S.C. § 119(b) to Chinese Patent Application No. 201710437814.5, filed Jun. 12, 2017, the disclosures of which are incorporated herein by reference.

FIELD OF THE INVENTION

The present invention relates to database management apparatuses and methods, and in particular, to a transaction savepoint management apparatus and a transaction savepoint management method for distributed databases.

BACKGROUND OF THE INVENTION

At present, with the increasing popularization of computer and network applications and the increasing abundance of the business types in different fields, it becomes more and more important to implement the operations directed to distributed databases based on user requests. Especially, special attention is paid to the management on a transaction (logically consisted of a group of operations on a database, this group of operations being based on a time sequence, wherein only if each operation in this group of operations is executed successfully, a transaction commit operation is only implemented, that is, all actual actions on the target database are implemented and stored; otherwise, a rollback operation is executed for the transaction to restore the database to the initial state prior to the implementation of the transaction, that is, there is no actual impact on the target database) and a transaction savepoint (used for saving the transaction state at a certain time point, that is, if the transaction is rolled back to the savepoint, the operations after the time point associated with the savepoint will be revoked) so as to guarantee the simultaneous completion of logically-associated operations.

In the prior art solutions, typically, a management operation directed to a transaction and a savepoint thereof can only be implemented for a centralized database, and there lacks an efficient transaction operation and management mechanism for distributed databases, so that it is difficult to guarantee the simultaneous completion of logically-associated operations for a distributed database system.

Therefore, there is a need to provide a transaction savepoint management apparatus and a transaction savepoint management method for distributed databases.

SUMMARY OF THE INVENTION

In order to solve the above problem of the prior art, the present invention provides a transaction savepoint management apparatus and a transaction savepoint management method for distributed databases.

The objects of the invention are achieved by the technical solutions below.

A transaction savepoint management apparatus including a control unit configured to create, based on a transaction initiation request received from a user terminal, a transaction including a plurality of operational instructions, and access at least one of a plurality of databases to sequentially execute the plurality of operational instructions in time sequence, wherein, if the plurality of operational instructions includes a global savepoint establishment instruction, the control unit is further configured to create and maintain a global savepoint queue so as to coordinate the plurality of databases to implement operations directed to a global savepoint, wherein the control unit is further configured to trigger, based on the global savepoint, a database involved in the transaction from among the plurality of databases to establish a local savepoint, and record an association relationship between each local savepoint and the global savepoint.

In the above disclosed solution, preferably, the transaction savepoint management apparatus further includes a savepoint establishment unit configured to execute a global savepoint establishment operation as driven by the control unit, wherein the global savepoint establishment operation includes: creating the global savepoint and recording it in the global savepoint queue, and setting the global savepoint as a latest global savepoint; checking a state of current local savepoint of each database involved in the transaction; and if the current local savepoint of a database is in a stable state, associating the current local savepoint in the stable state with the global savepoint, otherwise, notifying the database to create a new local savepoint and associate the new local savepoint with the global savepoint.

In the above disclosed solutions, preferably, the transaction savepoint management apparatus further includes a savepoint rollback unit configured to execute a global savepoint rollback operation as driven by the control unit, wherein the global savepoint rollback operation includes: if the current local savepoint of a database involved in the transaction is in a stable state and is required to be rolled back to the local savepoint associated with an object global savepoint to wich the global savepoint rollback operation is directed, not triggering the database to execute a local savepoint rollback operation, and deleting only the association relationship between each global savepoint after the object global savepoint and the current local savepoint; otherwise, triggering the database to execute the local savepoint rollback operation to roll back to the local savepoint associated with the object global savepoint, deleting the association relationship between each global savepoint after the object global savepoint and the current local savepoint, and deleting all the global savepoints after the object global savepoint in time sequence.

In the above disclosed solutions, preferably, the transaction savepoint management apparatus further includes a savepoint release unit configured to execute a global savepoint release operation as driven by the control unit, wherein the global savepoint release operation includes: deleting the association relationship between the global savepoint to be deleted and the local savepoint of each database involved, and deleting the global savepoint from the global savepoint queue; and checking whether the local savepoint in each database involved has the association relationship with any other global savepoint, and triggering a database involved to execute a local savepoint release operation if the local savepoint of the database has no association relationship with any other global savepoint.

In the above disclosed solutions, preferably, when a database involved in the transaction is accessed for the first time to execute a related operational instruction, the database first establishes a subtransaction and execute the related operational instruction.

In the above disclosed solutions, preferably, the transaction savepoint management apparatus further includes a savepoint reset unit configured to execute a global savepoint reset operation as driven by the control unit, wherein the global savepoint reset operation includes: setting a location, of the global savepoint to be reset, in time sequence as latest; resetting, if a current local savepoint of a database involved in the transaction is in a stable state, the local savepoint of the database associated with the global savepoint as the current local savepoint in the stable state; and executing a local savepoint reset operation, if the current local savepoint of the database associated with the global savepoint is not associated with any other global savepoint and the database has no local savepoint in the stable state or the local savepoint in the stable state is not associated with the global savepoint.

In the above disclosed solutions, preferably, the control unit is further configured to trigger each database involved to release the local savepoint that is not associated with any global savepoint.

In the above disclosed solutions, preferably, the control unit is further configured to, when a new database needs to be added to execute the transaction, trigger, if there has been a global savepoint, the new database to establish at least one local savepoint and associate the at least one local savepoint with the global savepoint.

The objects of the invention may also be realized in the technical solution below:

A transaction savepoint management method including: creating, based on a transaction initiation request from a user terminal, a transaction including a plurality of operational instructions, and accessing at least one of a plurality of databases to sequentially execute the plurality of operational instructions in time sequence; if the plurality of operational instructions includes a global savepoint establishment instruction, creating and maintaining a global savepoint queue so as to coordinate the plurality of databases to implement operations directed to a global savepoint, triggering, based on the global savepoint, a database involved in the transaction from among the plurality of databases to establish a local savepoint, and recording an association relationship between each local savepoint and the global savepoint.

The transaction savepoint management apparatus and the transaction savepoint management method for distributed databases disclosed in the invention have the advantages of: 1) coordinating a plurality of distributed databases to implement a savepoint management and maintenance operation; and 2) significantly improving the system performance due to the reduction of unnecessary local savepoint creation operations.

BRIEF DESCRIPTION OF THE DRAWINGS

The technical characteristics and advantages of the invention will be better understood by one skilled in the art in conjunction with the drawings, wherein:

FIG. 2 is a flow chart of a transaction savepoint management method according to an embodiment of the invention;

DETAILED DESCRIPTION OF THE EMBODIMENTS

Figure 1:
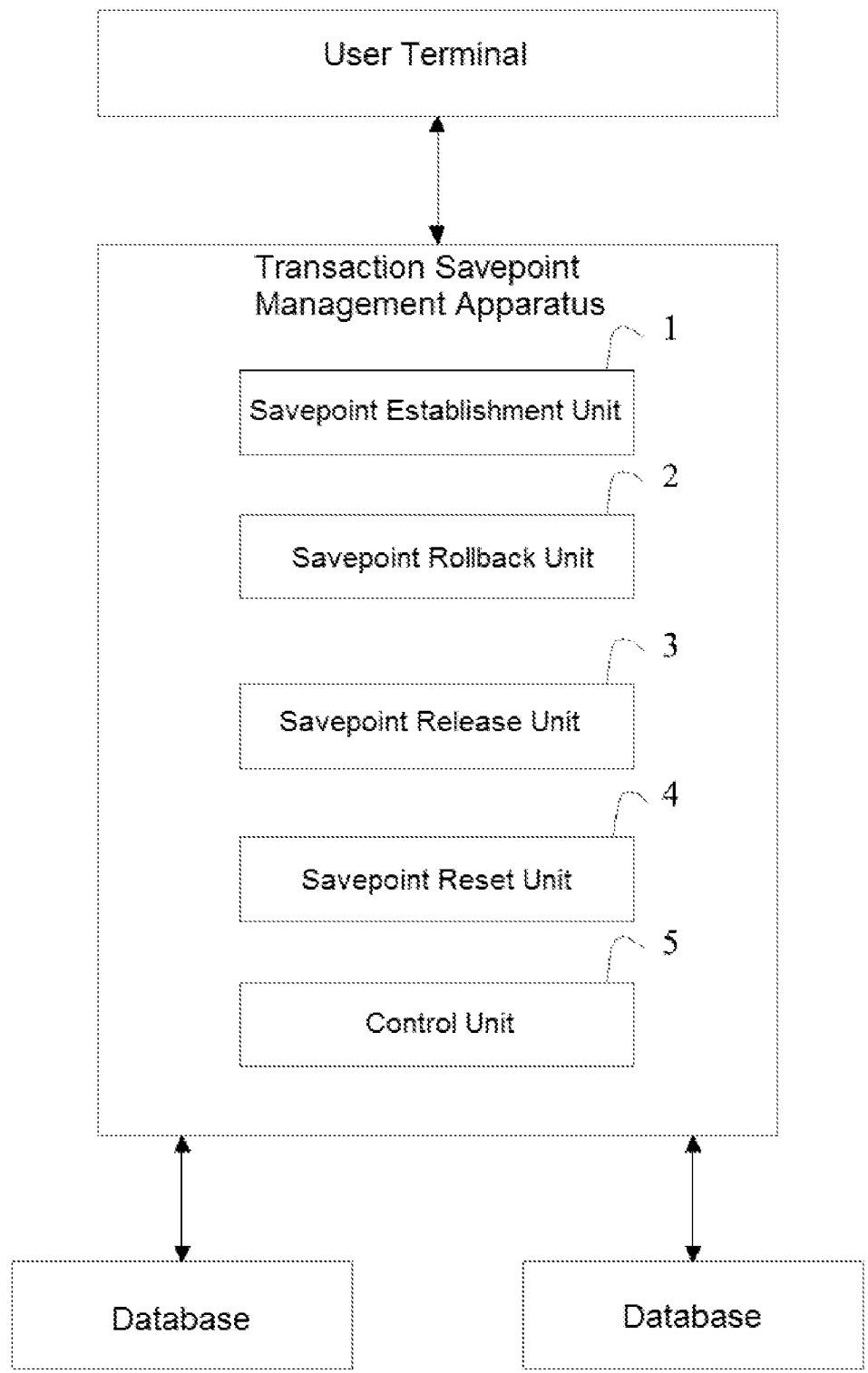
FIG. 1 is a schematic diagram of a transaction savepoint management apparatus according to an embodiment of the invention.

FIG. 1 is a schematic diagram of a transaction savepoint management apparatus according to an embodiment of the invention. As shown in FIG. 1, the transaction savepoint management apparatus disclosed in the invention at least includes a control unit 5, which is configured to create, based on a transaction initiation request received from a user terminal, a transaction includes a plurality of operational instructions (for example, a plurality of SQL statements), and access at least one of a plurality of databases to sequentially execute the plurality of operational instructions in time sequence, wherein, if the plurality of operational instructions includes a global savepoint establishment instruction, the control unit 5 is further configured to create and maintain a global savepoint queue so as to coordinate the plurality of databases to implement operations directed to a global savepoint, wherein, the control unit 5 triggers, based on the global savepoint, a database involved in the transaction from among the plurality of databases to establish a local savepoint, and records an association relationship between each local savepoint and the global savepoint.

Exemplarily, in one embodiment of the transaction savepoint management apparatus disclosed in the invention, the transaction savepoint management apparatus further includes a savepoint establishment unit 1 configured to execute a global savepoint establishment operation as driven by the control unit 5, wherein the global savepoint establishment operation includes: creating the global savepoint and recording it in the global savepoint queue, and setting the global savepoint as a latest global savepoint; checking a state of a current local savepoint of each database involved in the transaction; and if the current local savepoint of a database is in a stable state, associating the current local savepoint in the stable state with the global savepoint, otherwise, notifying the database to create a new local savepoint and associate the new local savepoint with the global savepoint. Wherein, if a certain database involved is in the state where the execution of an operation of rollback to a certain local savepoint will not have an impact on the database, it will be called that the current local savepoint of the database is in a stable state. This state is generally generated in the following two scenes: 1) after a database involved creates a local savepoint, no operation that has an impact on the local transaction (data write) will be executed, thus it will be continuously in a local savepoint stable state, and the corresponding local savepoint will be used as the latest created local savepoint, and correspondingly, once an operation that has an impact on the local transaction (for example, data write) is executed, the current local savepoint of the database will no longer be in the stable state; 2) after the database involved rolls back to a certain local savepoint, no operation that has an impact on the local transaction (data write) will be executed, thus the database will be continuously in a local savepoint stable state, and the local savepoint corresponding thereto will be used as the latest created local savepoint, and correspondingly, once an operation that has an impact on the local transaction (for example, data write) is executed, it will be no longer in the local savepoint stable state.

Exemplarily, in one embodiment of the transaction savepoint management apparatus disclosed in the invention, the transaction savepoint management apparatus further includes a savepoint rollback unit 2 configured to execute a global savepoint rollback operation as driven by the control unit 5, wherein the global savepoint rollback operation includes: if a current local savepoint of a database involved in the transaction is in a stable state and is required to be rolled back to the local savepoint associated with an object global savepoint to which the global savepoint rollback operation is directed, not triggering the database to execute a local savepoint rollback operation, and deleting only the association relationship between each global savepoint after the object global savepoint and the local savepoint; (therefore, unnecessary local rollback operations will be reduced); otherwise, triggering the database to execute the local savepoint rollback operation to roll back to the local savepoint associated with the object global savepoint, deleting the association relationship between each global savepoint after the object global savepoint and the local savepoint, and deleting all the global savepoints after the object global savepoint in time sequence.

Exemplarily, in one embodiment of the transaction savepoint management apparatus disclosed in the invention, the transaction savepoint management apparatus further includes a savepoint release unit 3 configured to execute a global savepoint release operation as driven by the control unit 5, wherein the global savepoint release operation includes: deleting the association relationship between the global savepoint to be deleted and the local savepoint of each database involved, and deleting the global savepoint from the global savepoint queue; and checking whether the local savepoint in each database involved has the association relationship with any other global savepoint, and triggering a database involved to execute a local savepoint release operation if the local savepoint of the database has no association relationship with any other global savepoint.

Exemplarily, in one embodiment of the transaction savepoint management apparatus disclosed in the invention, when a database involved in the transaction is accessed for the first time to execute a related operational instruction, the database first establishes a subtransaction and execute the related operational instruction.

Exemplarily, in one embodiment of the transaction savepoint management apparatus disclosed in the invention, the transaction savepoint management apparatus further includes a savepoint reset unit 4 configured to execute a global savepoint reset operation as driven by the control unit 5, wherein the global savepoint reset (i.e., coverage) operation includes: setting, a location of the global savepoint to be reset, in time sequence as latest; resetting, if a current local savepoint of a database involved in the transaction is in a stable state, the local savepoint of the database associated with the global savepoint as the current local savepoint in the stable state; and executing a local savepoint reset operation (which will not change the existing association relationship between the global savepoint and the local savepoint), if the local savepoint of the database associated with the global savepoint is not associated with any other global savepoint, and the database has no local savepoint in the stable state or the local savepoint in the stable state is not associated with the global savepoint.

Exemplarily, in one embodiment of the transaction savepoint management apparatus disclosed in the invention, the control unit 5 is further configured to trigger each database involved to release the local savepoint that is not associated with any global savepoint.

Exemplarily, in one embodiment of the transaction savepoint management apparatus disclosed in the invention, the control unit 5 is further configured to, when a new database needs to be added to execute the transaction, trigger, if there has been a global savepoint, the new database to establish at least one local savepoint and associate the at least one local savepoint with the global savepoint. Wherein, because most of the databases will record the starting point of the local transaction, that is, take the starting point of the local transaction as an implicit local savepoint, the global savepoint may be associated with the starting point of the local transaction, and as a result, the operations of establishing a local savepoint may be reduced. Alternatively, an explicit local savepoint establishment mode may be employed.

Therefore, the transaction savepoint management apparatus disclosed in the invention has the following advantages: 1) a plurality of distributed databases can be coordinated to implement a savepoint management and maintenance operation; 2) the system performance can be significantly improved due to the reduction of unnecessary local savepoint creation operations.

FIG. 2 is a flow chart of a transaction savepoint management method according to an embodiment of the invention. As shown in FIG. 2, a transaction savepoint management method disclosed in the invention includes: creating, based on a transaction initiation request from a user terminal, a transaction including a plurality of operational instructions (for example, a plurality of SQL statements), and accessing at least one of a plurality of databases to sequentially execute the plurality of operational instructions in time sequence; if the plurality of operational instructions includes a global savepoint establishment instruction, creating and maintaining a global savepoint queue so as to coordinate the plurality of databases to implement operations directed to a global savepoint, triggering, based on the global savepoint, a database involved in the transaction from among the plurality of databases to establish a local savepoint, and recording an association relationship between each local savepoint and the global savepoint.

Exemplarily, in one embodiment of the transaction savepoint management method disclosed in the invention, the method further includes executing a global savepoint establishment operation based on a request from a user terminal, wherein the global savepoint establishment operation includes: creating the global savepoint and recording it in the global savepoint queue, and setting the global savepoint as a latest global savepoint; checking a state of a current local savepoint of each database involved in the transaction; and if the current local savepoint of a database is in a stable state, associating the current local savepoint in the stable state with the global savepoint, otherwise, notifying the database to create a new local savepoint and associate the new local savepoint with the global savepoint. Wherein, if a certain database involved is in the state where the execution of an operation of rollback to a certain local savepoint will not has an impact on the database, it will be called that the current local savepoint of the database is in a stable state. This state is generally generated in the following two scenes: 1) after a database involved creates a local savepoint, no operation that has an impact on the local transaction (data write) will be executed, thus it will be continuously in a local savepoint stable state, and the corresponding local savepoint will be used as the latest created local savepoint, and correspondingly, once an operation that has an impact on the local transaction (for example, data write) is executed, the current local savepoint of the database will no longer be in the stable state; 2) after the database involved is rolled back to a certain local savepoint, no operation that has an impact on the local transaction (data write) will be executed, thus the database will be continuously in a local savepoint stable state, and the local savepoint corresponding thereto will be used as the latest created local savepoint, and correspondingly, once an operation that has an impact on the local transaction (for example, data write) is executed, it will be no longer in the local savepoint stable state.

Exemplarily, in one embodiment of the transaction savepoint management method disclosed in the invention, the method further includes executing a global savepoint rollback operation based on a request from a user terminal, wherein the global savepoint rollback operation includes: if the current local savepoint of a database involved in the transaction is in the stable state and is required to be rolled back to the local savepoint associated with an object global savepoint to which the global savepoint rollback operation is directed, not triggering the database to execute a local savepoint rollback operation, and deleting only the association relationship between each global savepoint after the object global savepoint and the local savepoint (therefore, unnecessary local rollback operations will be reduced); otherwise, triggering the database to execute the local savepoint rollback operation to roll back to the local savepoint associated with the object global savepoint, deleting the association relationship between each global savepoint after the object global savepoint and the local savepoint, and deleting all the global savepoints after the object global savepoint in time sequence.

Exemplarily, in one embodiment of the transaction savepoint management method disclosed in the invention, the method further includes executing a global savepoint release operation based on a request from a user terminal, wherein the global savepoint release operation includes: deleting the association relationship between the global savepoint to be deleted and the local savepoint of each database involved, and deleting the global savepoint from the global savepoint queue; and checking whether the local savepoint in each database involved has the association relationship with any other global savepoint, and triggering a database involved to execute a local savepoint release operation if the local savepoint of the database has no association relationship with any other global savepoint.

Exemplarily, in one embodiment of the transaction savepoint management method disclosed in the invention, when a database involved in the transaction is accessed for the first time to execute a related operational instruction, the database first establishes a subtransaction and execute the related operational instruction.

Exemplarily, in one embodiment of the transaction savepoint management method disclosed in the invention, the method further includes executing a global savepoint reset operation based on a request from a user terminal, wherein the global savepoint reset (i.e., coverage) operation includes: setting, a location of the global savepoint to be reset, in time sequence as latest; resetting, if a current local savepoint of a database involved in the transaction is in a stable state, the local savepoint of the database associated with the global savepoint as the current local savepoint in the stable state; and executing a local savepoint reset operation (which will not change the existing association relationship between the global savepoint and the local savepoint), if the local savepoint of the database associated with the global savepoint is not associated with any other global savepoint, and the database has no local savepoint in the stable state or the local savepoint in the stable state is not associated with the global savepoint.

Exemplarily, in one embodiment of the transaction savepoint management method disclosed in the invention, the method further includes: triggering each database involved to release the local savepoint that is not associated with any global savepoint.

Exemplarily, in one embodiment of the transaction savepoint management method disclosed in the invention, the method further includes: when a new database needs to be added to execute the transaction, triggering, if there has been a global savepoint, the new database to establish at least one local savepoint and associate the at least one local savepoint with the global savepoint. Wherein, because most of the databases will record the starting point of the local transaction, that is, take the starting point of the local transaction as an implicit local savepoint, the global savepoint may be associated with the starting point of the local transaction, and as a result, the operations of establishing a local savepoint may be reduced. Alternatively, an explicit local savepoint establishment mode may be employed.

Therefore, the transaction savepoint management method disclosed in the invention has the following advantages: 1) a plurality of distributed databases can be coordinated to implement a savepoint management and maintenance operation; 2) the system performance can be significantly improved due to the reduction of unnecessary local savepoint creation operations.

Figure 3:
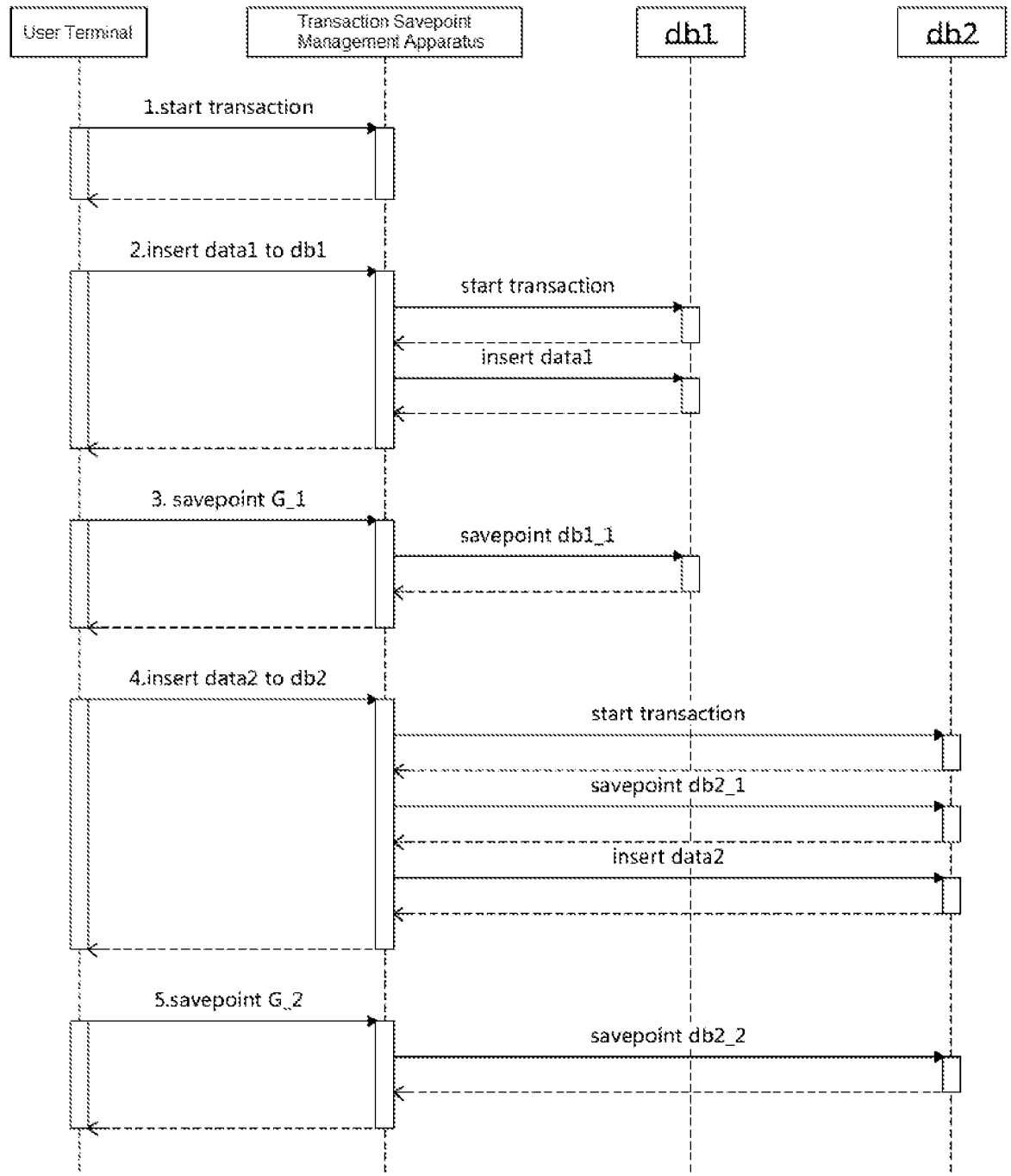
FIG. 3 is a schematic flow chart of a transaction savepoint management operation according to an embodiment of the invention.

FIG. 3 is a schematic flow chart of a transaction savepoint management operation according to an embodiment of the invention. In the example shown in FIG. 3, the user requests to sequentially execute the following 5 SQL statements:

1: start transaction;
2: insert data1 to db1;
3: savepoint G_1;
4: insert data2 to db2;
5: savepoint G_2.

The above each statement has the execution processing logic as follows:

1. When the transaction savepoint management apparatus receives a transaction start statement "start transaction", the transaction savepoint management apparatus directly responses to the requester (i.e., the user terminal) because no actual participant is determined;

2. When the user terminal sends "insert data1 to db1", the purpose of the statement is to insert data to database db1, and at this point, the transaction savepoint management apparatus is responsible for sending the transaction start statement to the participating database db1 and then forwards the data insert statement;

3. When the user terminal sends "savepoint G_1", a global savepoint G_1 is required to be created, and at this point, the transaction savepoint management apparatus notifies the database db1 to create a savepoint db1_1, maintains an association relationship between G_1 and db1_1 as shown in Table 2, and records the global savepoint sequence number of G_1 as 1;

4. When the user terminal sends "insert data2 to db2", the purpose of the statement is to insert data to the participating database db2. Since db2 previously has not participated in the global transaction, the transaction savepoint management apparatus needs to send a transaction start statement "start transaction" to the participating database db2, and after joining the global transaction, db2 will find that there has been a global savepoint G_1, thus the transaction savepoint management apparatus needs to notify db2 to create a local savepoint db2_1, and maintains an association relationship between local savepoint db2_1 and global savepoint G_1 as shown in Table 3;

5. When the user terminal sends "savepoint G_2", a global savepoint G_2 is required to be created as shown in Table 4, and at this point, there is no data modification from the previous local transaction savepoint db1_1 in db1, thus db1_1 is only required to be associated with G_2, while there exists data modification from the previous local savepoint db2_1 in db2, thus the transaction savepoint management apparatus needs to notify db2 to create a local savepoint db2_2, and saves an association relationship between db2_2 and G_2.

TABLE 1

Corresponding execution of the statements on each database connection in Example 1

| Local Statement | DB1 Execution Statement | DB1 State | DB2 Execution Statement | DB2 State |
|---|---|---|---|---|
| 1: start transaction;<br>2: insert data1 to db1; | start transaction;<br>insert data1 to db1; | | | |
| 3: savepoint G_1; | Savepoint db1_1; | db1_1 | | |
| 4: insert data2 to db2; | | db1_1 | start transaction;<br>savepoint db2_1;<br>insert data2 to db2 | |
| 5: savepoint G_2; | | db1_1 | | db2_2 |

TABLE 2

Correspondence relationship between global savepoint and database local savepoint after completion of the 3$^{rd}$ statement in Example 1

| Savepoint Sequence Number | Global Savepoint | DB1 Local Savepoint |
|---|---|---|
| 1 | G_1 | db1_1 |

TABLE 3

Correspondence relationship between global savepoint and database local savepoint after completion of the 4$^{th}$ statement in Example 1

| Savepoint Sequence Number | Global Savepoint | DB1 Local Savepoint | DB2 Local Savepoint |
|---|---|---|---|
| 1 | G_1 | db1_1 | db2_1 |

TABLE 4

Correspondence relationship between global savepoint and database local savepoint after completion of the 5$^{th}$ statement in Example 1

| Savepoint Sequence Number | Global Savepoint | DB1 Local Savepoint | DB2 Local Savepoint |
|---|---|---|---|
| 1 | G_1 | db1_1 | db2_1 |
| 2 | G_2 | db1_1 | db2_2 |

Figure 4:
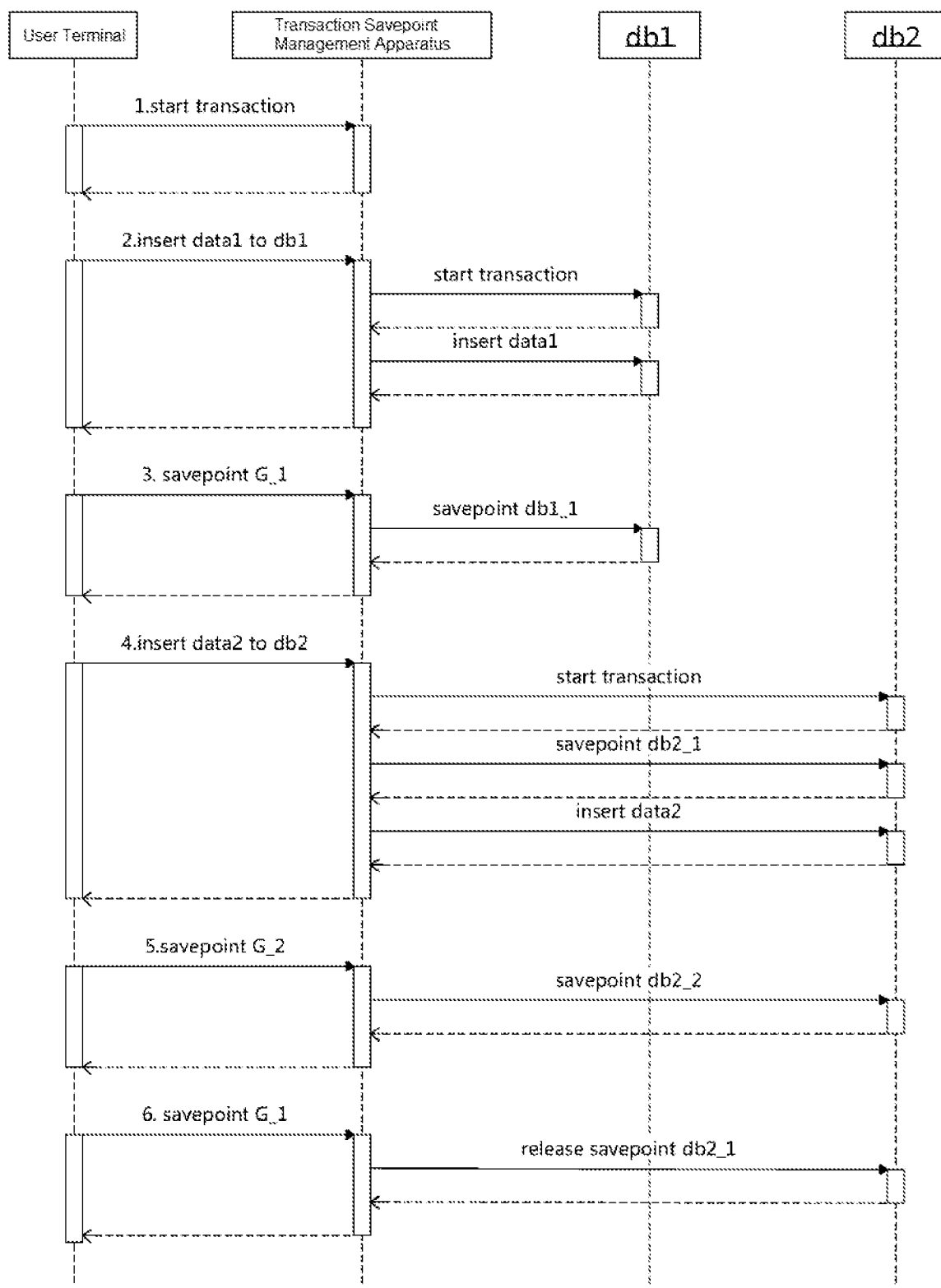
FIG. 4 is a schematic flow chart of another transaction savepoint management operation according to an embodiment of the invention.

FIG. 4 is a schematic flow chart of another transaction savepoint management operation according to an embodiment of the invention. In the example shown in FIG. 4, the user requests to sequentially execute the following 6 SQL statements:

1: start transaction;
2: insert data1 to db1;
3: savepoint G_1;
4: insert data2 to db2;
5: savepoint G_2;
6: savepoint G_1;

Wherein, the 6$^{th}$ statement is used for resetting global savepoint G_1.

In this example, only the execution of statement 6 is added on the basis of Example 1, thus only the execution of 6$^{th}$ statement will be illustrated below, and no other illustration will be repeated: when the user terminal sends the 6$^{th}$ statement "savepoint G_1", the purpose of this statement is to reset savepoint "savepoint G_1" because the global savepoint G_1 has been established previously, and at this point, the transaction savepoint management apparatus deletes the association relationship record of the original G_1 and checks the state of the participating database db1, as a result of which it finds that the database db1 is in local savepoint db1_1 stable state, while it checks the state of the participating database db2, as a result of which it finds that the database db2 is in local savepoint db2_2 stable state, thus as shown in Table 5, G_1 is set as the latest savepoint in time sequence and is associated with local savepoints db1_1 and db2_2. At the same time, it finds that local savepoint db2_1 of db2 is no longer associated with any global savepoint, and at this point, local savepoint db2_1 may be released, thus the transaction savepoint management apparatus needs to notify the participating database db2 to release local savepoint db2_1.

TABLE 5

Correspondence relationship between global savepoint and database local savepoint after completion of the 6$^{th}$ statement in Example 2

| Time Sequence | Global savepoint | DB1 local savepoint | DB2 local savepoint |
|---|---|---|---|
| 4 | ~~G_1~~ | ~~db1_1~~ | ~~db2_1~~ |
| 2 | G_2 | db1_1 | db2_2 |
| 3 | G_1 | db1_1 | db2_2 |

Figure 5:
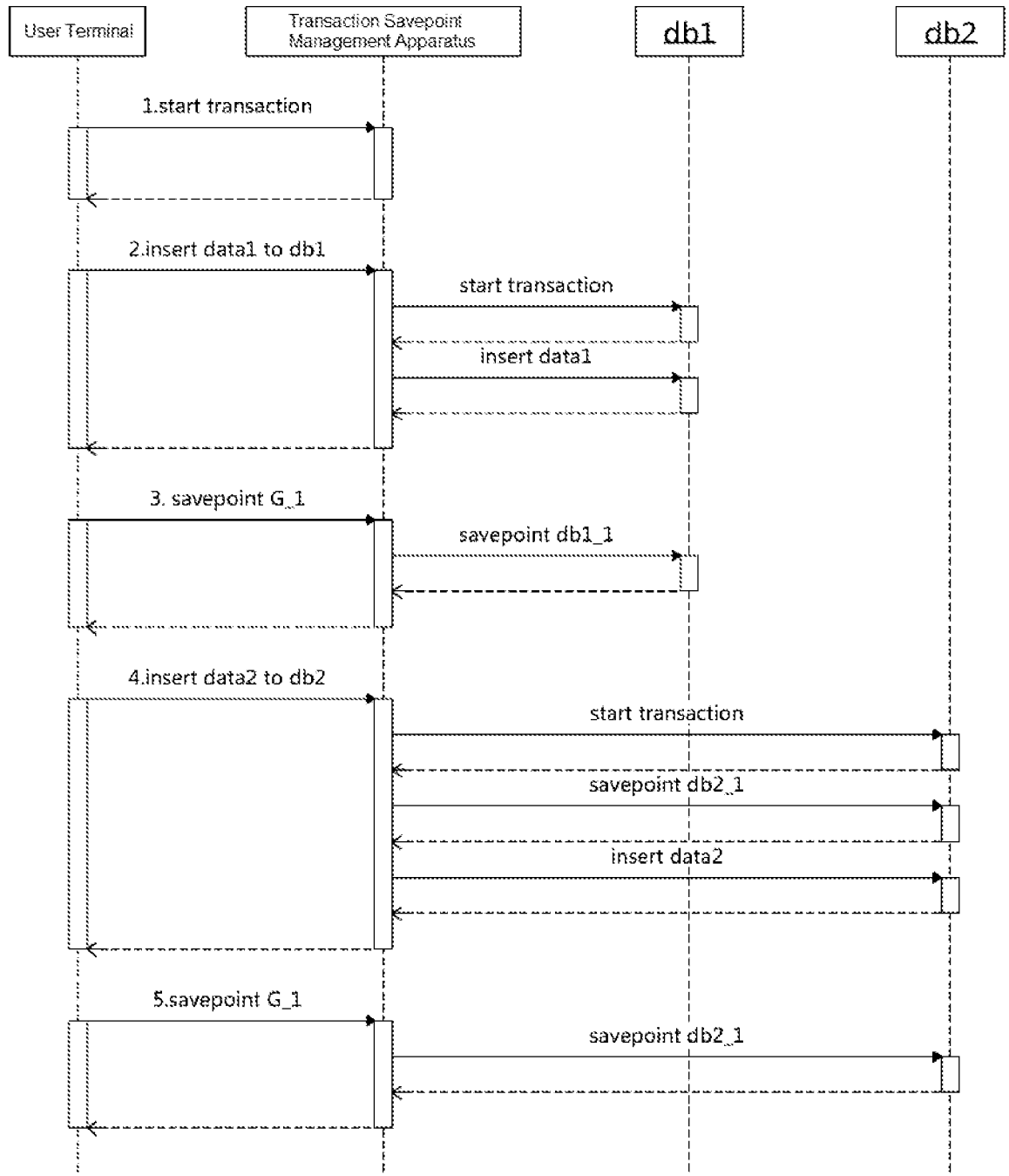
FIG. 5 is a schematic flow chart of another transaction savepoint management operation according to an embodiment of the invention.

FIG. 5 is a schematic flow chart of another transaction savepoint management operation according to an embodiment of the invention. In the example shown in FIG. 5, the user requests to sequentially execute the following 5 SQL statements:

1: start transaction;
2: insert data1 to db1;
3: savepoint G_1;
4: insert data2 to db2;
5: savepoint G_1;

Wherein, the 5$^{th}$ statement is used for resetting global savepoint G_1.

In this example, only statement 5 is modified on the basis of Example 1, thus only the execution of the 5$^{th}$ statement will be illustrated below, and no other illustration will be repeated: when the user terminal sends the 5$^{th}$ statement "savepoint G_1", the purpose of this statement is to reset the savepoint "savepoint G_1" because the global savepoint G_1 has been established previously, and at this point, the transaction savepoint management apparatus deletes the association relationship record of the original G_1 and checks the state of the participating database db1, as a result of which it finds that the database db1 is in local savepoint db1_1 stable state, thus it associates G_1 with db1_1. Subsequently it checks the state of the participating database db2, as a result of which it finds that database db2 is not in local savepoint stable state, while it finds that db2_1 is only associated with the original global savepoint G_1, thus the transaction savepoint management apparatus needs to notify the participating database db2 to reset local savepoint db2_1 and then associate db2_1 with global savepoint G_1, and finally, as shown in Table 6, G_1 is set as the latest savepoint in time sequence and associated with local savepoints db1_1 and db2_1.

TABLE 6

Correspondence relationship between global savepoint and database local savepoint after completion of the 5$^{th}$ statement in Example 3

| Savepoint Sequence Number | Global Savepoint | DB1 Local Savepoint | DB2 Local Savepoint |
|---|---|---|---|
| ~~1~~ | ~~G_1~~ | ~~db1_1~~ | ~~db2_1~~ |
| 2 | G_2 | db1_1 | db2_1 |

Figure 6:
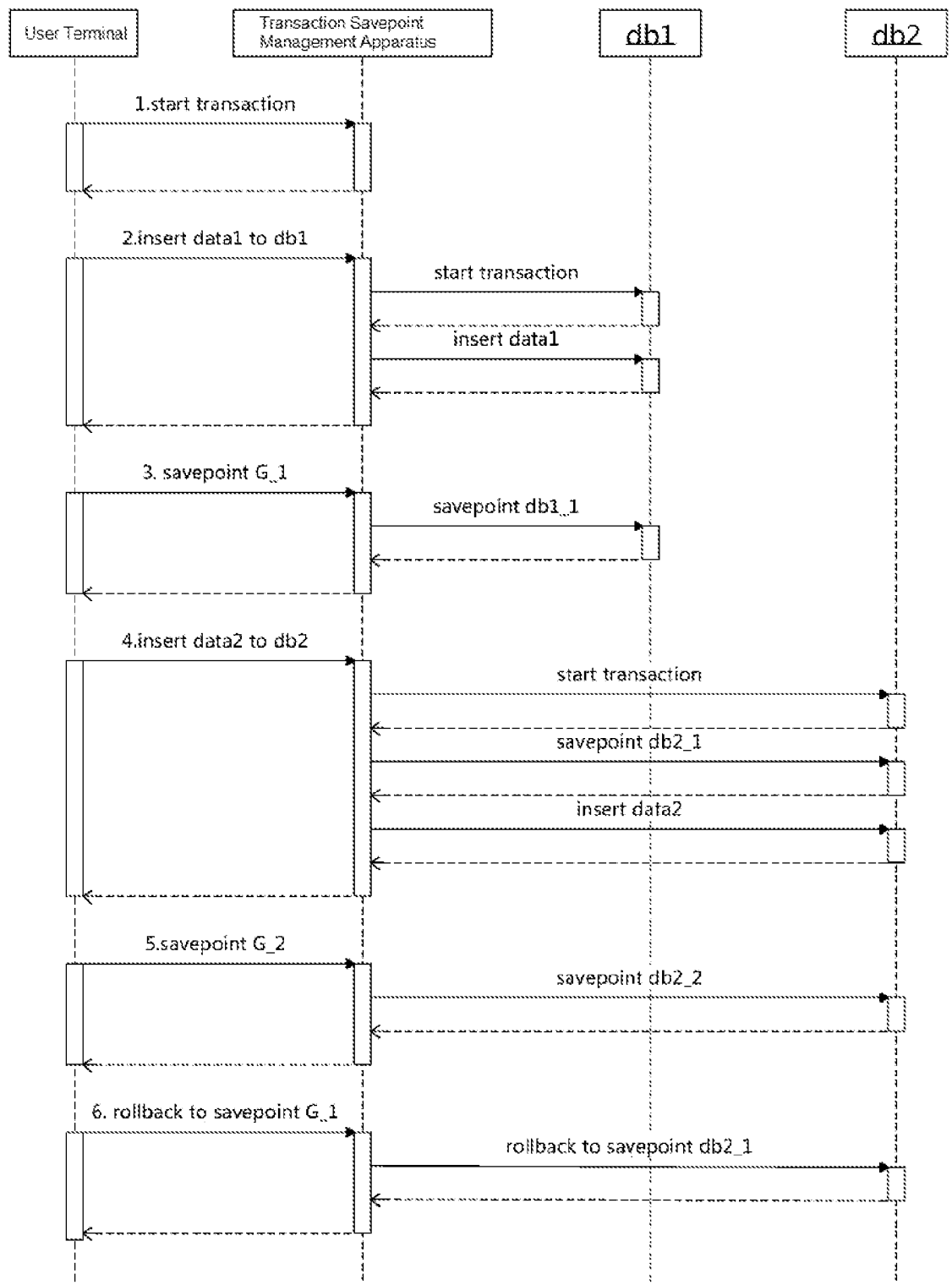
FIG. 6 is a schematic flow chart of another transaction savepoint management operation according to an embodiment of the invention.

FIG. 6 is a schematic flow chart of another transaction savepoint management operation according to an embodiment of the invention. In the example shown in FIG. 6, the user request sequentially executes the following 6 SQL statements:

1: start transaction;
2: insert data1 to db1;
3: savepoint G_1;
4: insert data2 to db2;
5: savepoint G_2;
6: rollback to savepoint G_1;

Wherein, the 6$^{th}$ statement is used for rolling back the global transaction to global savepoint G_1.

In this example, only the execution of statement 6 is added on the basis of Example 1, thus only the execution of 6$^{th}$ statement will be illustrated below, and no other illustration will be repeated: when the user terminal sends the 6$^{th}$ statement "rollback to savepoint G_1", the purpose of this statement is to roll back the global transaction to G_1, and the transaction savepoint management apparatus finds that the local savepoints associated with G_1 are db1_1 and db2_2 respectively, and the participating database db1 is now in savepoint stable state of db_1, thus no operation needs to be executed by the participating database db1, while the participating database db2 is not in the savepoint stable state of db2_1, thus the transaction savepoint management apparatus needs to notify the participating database db2 to execute a local savepoint rollback operation to roll back to db2_1. At the same time, the transaction savepoint management apparatus needs to delete all the invalid global savepoints after G_1 and the association relationship between the global savepoints and the local savepoint. Finally, Table 7 shows the global savepoint sequence information recorded by the transaction savepoint management apparatus and the association relationship between the global savepoint and the local savepoint after the completion of the above 6 statements.

TABLE 7

Correspondence relationship between global savepoint and database savepoint after completion of the 6$^{th}$ statement in Example 4

| Time Sequence | Global Savepoint | DB1 Local Savepoint | DB2 Local Savepoint |
|---|---|---|---|
| 1 | G_1 | db1_1 | db2_1 |
| ~~2~~ | ~~G_2~~ | ~~db1_1~~ | ~~db2_2~~ |

Figure 7:
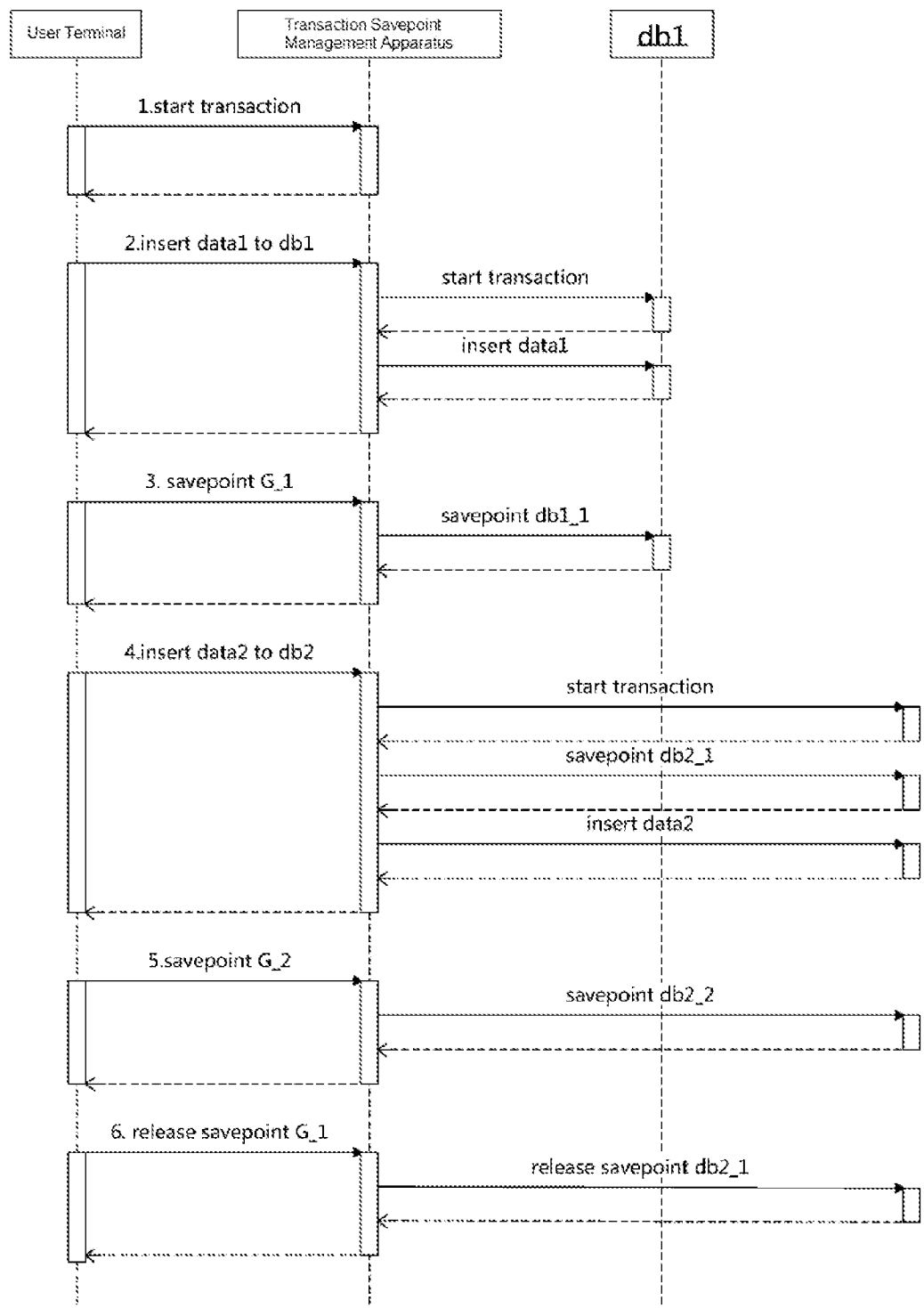
FIG. 7 is a schematic flow chart of another transaction savepoint management operation according to an embodiment of the invention.

FIG. 7 is a schematic flow chart of another transaction savepoint management operation according to an embodiment of the invention, In the example shown in FIG. 7, the user requests to sequentially execute the following 6 SQL statements:

1: start transaction;
2: insert data1 to db1;
3: savepoint G_1;
4: insert data2 to db2;
5: savepoint G_2;
6: release savepoint G_1;

Wherein, the 6$^{th}$ statement is used for releasing global savepoint G_1.

In this example, only the execution of statement 6 is added on the basis of Example 1, thus only the execution of 6$^{th}$ statement will be illustrated below, and no other illustration will be repeated: when the user terminal sends the 6$^{th}$ statement "release savepoint G_1", the purpose of this statement is to release global savepoint G_1. The transaction savepoint management apparatus deletes the global savepoint sequence information containing G_1 and the association relationship between G_1 and the local savepoint, while it will be found that local savepoint db2_1 of the participating database db2 is not associated with any global savepoint, thus the transaction savepoint management apparatus notifies the participating database db2 to release local savepoint db2_1. Finally, Table 8 shows the global savepoint sequence information recorded by the transaction savepoint management apparatus and the association relationship between the global savepoint and the local savepoint after the completion of the above 6 statements.

TABLE 8

Correspondence relationship between global savepoint and database local savepoint after implementation of the 6$^{th}$ statement in Example 5

| Savepoint Sequence Number | Global Savepoint | DB1 Local Savepoint | DB2 Local Savepoint |
|---|---|---|---|
| ~~1~~ | ~~G_1~~ | ~~db1_1~~ | ~~db2_1~~ |
| 2 | G_2 | db1_1 | db2_2 |

Although the invention has been described via the above preferred embodiments, the implementation of the invention is not limited thereto. It should be understood that, different variations and modifications can be made to the invention by one skilled in the art without departing from the subject matter and scope of the invention.

What is claimed is:

1. A transaction savepoint management apparatus, comprising at least a control unit configured to create, based on a transaction initiation request received from a user terminal, a transaction comprising a plurality of operational instructions, and access at least one of a plurality of databases to sequentially execute the plurality of operational instructions in time sequence, wherein if the plurality of operational instructions comprise a global savepoint establishment instruction, the control unit is further configured to create and maintain a global savepoint queue so as to coordinate the plurality of databases to implement operations directed to a global savepoint, wherein the control unit is further configured to trigger, based on the global savepoint, a database involved in the transaction from among the plurality of databases to establish a local savepoint, and record an association relationship between each local savepoint and the global savepoint, wherein the transaction savepoint management apparatus further comprises a savepoint establishment unit configured to execute a global savepoint establishment operation as driven by the control unit, wherein the global savepoint establishment operation comprises: creating a global savepoint and recording the global savepoint in the global savepoint queue, and setting the global savepoint as a latest global savepoint; checking a state of a last local savepoint, existing prior to the global savepoint establishment operation, of each database involved in the transaction; and if the last local savepoint of a database is in a stable state, associating the last local savepoint in the stable state with the global savepoint, otherwise, notifying the database to create a new local savepoint and associating the new local savepoint with the global savepoint.

2. The transaction savepoint management apparatus according to claim 1, further comprising a savepoint rollback unit configured to execute a global savepoint rollback operation as driven by the control unit, wherein the global savepoint rollback operation comprises: if the current local savepoint of a database involved in the transaction is in the stable state and is required to be rolled back to the local savepoint associated with an object global savepoint to which the global savepoint rollback operation is directed, not triggering the database to execute a local savepoint rollback operation, and deleting only the association relationship between each global savepoint after the object global savepoint and the local savepoint; otherwise, triggering the database to execute the local savepoint rollback operation to roll back to the local savepoint associated with the object global savepoint, deleting the association relationship between each global savepoint after the object global savepoint and the local savepoint, and deleting all the global savepoints after the object global savepoint in time sequence.

3. The transaction savepoint management apparatus according to claim 2, further comprising a savepoint release unit configured to execute a global savepoint release operation as driven by the control unit, wherein the global savepoint release operation comprises: deleting the association relationship between the global savepoint to be deleted and the local savepoint of each database involved, and deleting the global savepoint from the global savepoint queue; and checking whether the local savepoint in each database involved has the association relationship with any other global savepoint, and triggering a database involved to execute a local savepoint release operation if the local savepoint of the database has no association relationship with any other global savepoint.

4. The transaction savepoint management apparatus according to claim 3, wherein, when a database involved in the transaction is accessed for the first time to execute a related operational instruction, the database first establishes a subtransaction and execute the related operational instruction.

5. The transaction savepoint management apparatus according to claim 4, further comprising a savepoint reset unit configured to execute a global savepoint reset operation as driven by the control unit, wherein the global savepoint reset operation comprises:
setting a location, of the global savepoint to be reset, in time sequence as latest; resetting, if a current local savepoint of a database involved in the transaction is in a stable state, the local savepoint of the database associated with the global savepoint as the current local savepoint in the stable state; and executing a local savepoint reset operation, if the local savepoint of the database associated with the global savepoint is not associated with any other global savepoint, and the database has no local savepoint in the stable state or the local savepoint in the stable state is not associated with the global savepoint.

6. The transaction savepoint management apparatus according to claim 5, wherein the control unit is further configured to trigger each database involved to release the local savepoint that is not associated with any global savepoint.

7. The transaction savepoint management apparatus according to claim 6, wherein the control unit is further configured to, when a new database needs to be added to execute the transaction, trigger, if there has been a global savepoint, the new database to establish at least one local savepoint, and associate the at least one local savepoint with the global savepoint.

8. A transaction savepoint management method, comprising:
creating, based on a transaction initiation request from a user terminal, a transaction comprising a plurality of operational instructions, and accessing at least one of a plurality of databases to sequentially execute the plurality of operational instructions in time sequence; if the plurality of operational instructions comprise a global savepoint establishment instruction, creating and maintaining a global savepoint queue so as to coordinate the plurality of databases to implement operations directed to a global savepoint, triggering, based on the global savepoint, a database involved in the transaction from among the plurality of databases to establish a local savepoint, and recording an association relationship between each local savepoint and the global savepoint, wherein the transaction savepoint management method further comprises executing a global savepoint establishment operation based on a request from a user terminal, wherein the global savepoint establishment operation includes: creating a global savepoint and recording the global savepoint in the global savepoint queue, and setting the global savepoint as a latest global savepoint; checking a state of a last local savepoint, existing prior to the global savepoint establishment operation, of each database involved in the transaction; and if the last local savepoint of a database is in a stable state, associating the last local savepoint in the stable state with the global savepoint, otherwise, notifying the database to create a new local savepoint and associating the new local savepoint with the global savepoint.

* * * * *